US006764043B2

(12) United States Patent
Sankrithi et al.

(10) Patent No.: US 6,764,043 B2
(45) Date of Patent: Jul. 20, 2004

(54) ROTATABLE SCARF INLET FOR AN AIRCRAFT ENGINE AND METHOD OF USING THE SAME

(75) Inventors: Mithra M. K. V. Sankrithi, Lake Forest Park, WA (US); Paul E. Nelson, University Place, WA (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 10/316,497

(22) Filed: Dec. 11, 2002

(65) Prior Publication Data

US 2004/0113014 A1 Jun. 17, 2004

(51) Int. Cl.[7] .............................................. B64C 33/02
(52) U.S. Cl. .................................. 244/53 B; 137/15.1
(58) Field of Search ........................... 244/53 B, 53 R; 60/39.092; 55/306; 137/15.1

(56) References Cited

U.S. PATENT DOCUMENTS

| | | | | |
|---|---|---|---|---|
| 2,876,621 | A | * | 3/1959 | Bogert et al. |
| 2,944,631 | A | * | 7/1960 | Kerry et al. |
| 2,970,431 | A | * | 2/1961 | Harshman |
| 3,628,459 | A | * | 12/1971 | Lesikar |
| 3,961,679 | A | * | 6/1976 | Love |
| 3,964,568 | A | | 6/1976 | Neumann |
| 4,172,572 | A | * | 10/1979 | Doig et al. |
| 4,248,487 | A | * | 2/1981 | Asberg |
| 5,722,231 | A | * | 3/1998 | Porte |
| 6,231,006 | B1 | * | 5/2001 | Gruensfelder et al. |
| 6,505,706 | B2 | | 1/2003 | Tse |

FOREIGN PATENT DOCUMENTS

| | | | |
|---|---|---|---|
| DE | 2514551 | * | 7/1976 |

OTHER PUBLICATIONS

N. J. Baker and C. L. Bewick, "Noise Test of a Negatively Scarfed Inlet Flare", AIAA Paper 2001–2139.
L. R. Clark, R.L. Dougherty, et al., "Inlet Shape Effects on the Far–Field Sound of a Model Fan", AIAA Paper 97–1589.
M. H. Dunn, J. Tweed, and R. St. John, "Sound Radiation from a Two–Dimensional Scarf Inlet Using the Noise Prediction Code TBIEM2D", AIAA Paper 98–2202.
C. Gerhold, et al., "Control of Inflow Distortion in a Scarf Inlet", AIAA Paper 2002–2432.
G. M. Keith, et al., "Acoustic Radiation from a Scarfed Cylinder", AIAA Paper 98–2201.
R. K. Nangia and M. E. Palmer, "Inlets with Negative Scarf for Acoustic Reduction—Aerodynamic Assessment at Transonic Speed", AIAA Paper 2000–4409.
R. K. Nangia and M. E. Palmer, "Negatively Scarfed Inlets for Acoustic Reduction, Aerodynamic Performance Assessment", AIAA Paper 2000–0354.

* cited by examiner

Primary Examiner—Tien Dinh
(74) Attorney, Agent, or Firm—Harness Dickey & Pierce P.L.C.

(57) ABSTRACT

A rotatable scarf inlet for an engine and a method of operating a jet aircraft engine on an aircraft. The rotatable scarf inlet is rotatably supported at a forward end portion of a nacelle of the engine. The rotatable scarf inlet is controllably rotatable relative to the engine nacelle to a plurality of angular positions to inhibit ingestion of foreign object debris or to improve airflow characteristics, depending on whether the aircraft is taxiing, taking off from a runway, or operating in a cruise condition. The method involves controllably rotating the rotatable scarf inlet with respect to the engine nacelle to a corresponding one of the plurality of angular positions.

46 Claims, 4 Drawing Sheets

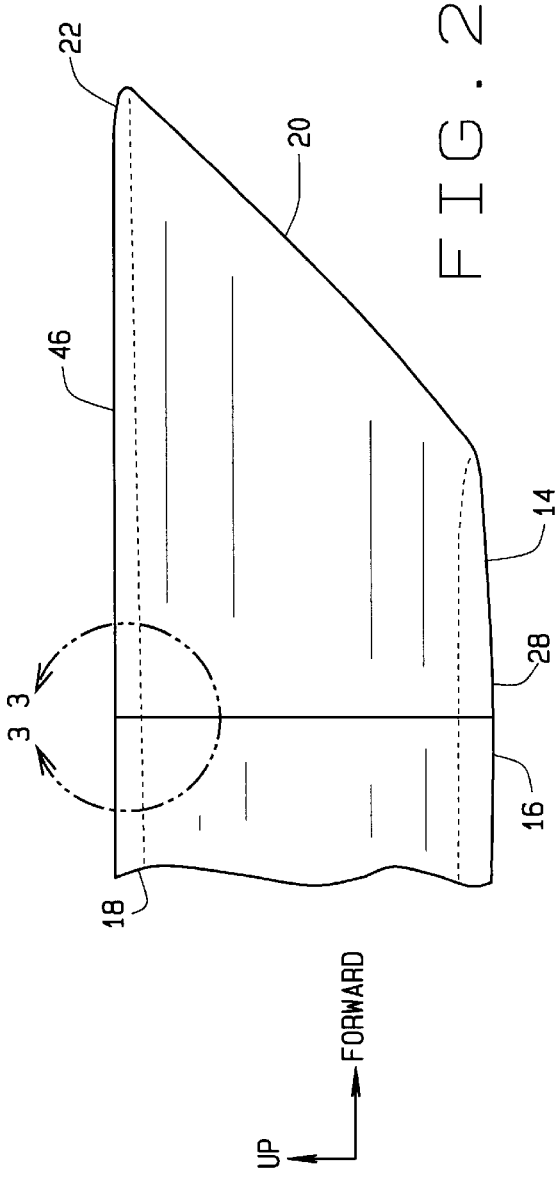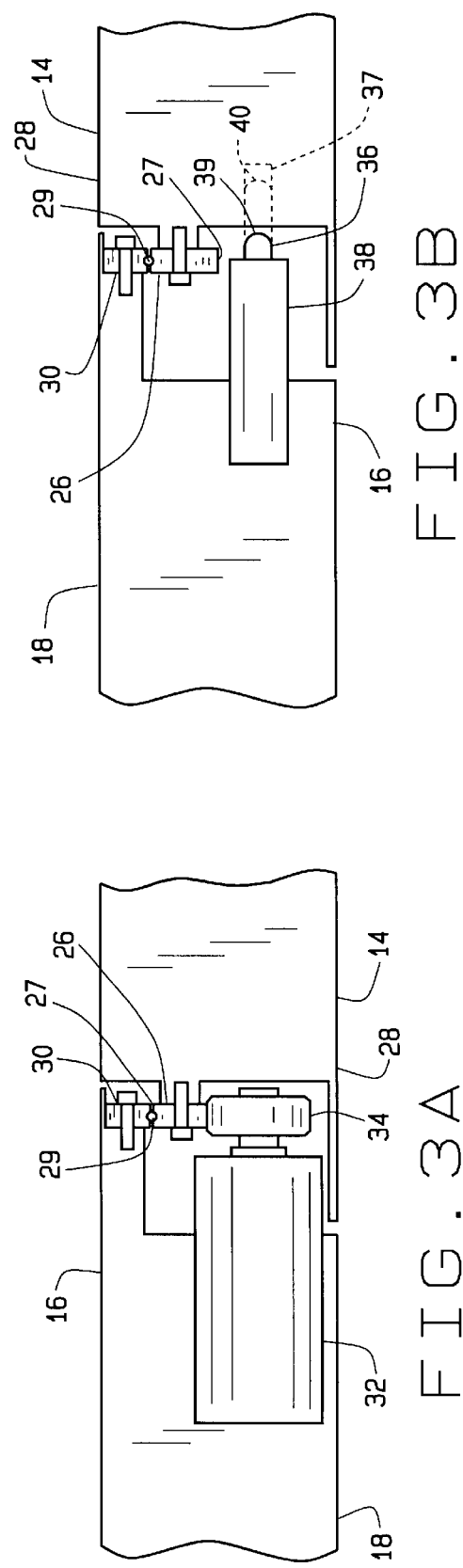

US 6,764,043 B2

ROTATABLE SCARF INLET FOR AN AIRCRAFT ENGINE AND METHOD OF USING THE SAME

FIELD OF THE INVENTION

The present invention relates generally to aircraft engines and more particularly to scarf inlets for aircraft engines.

BACKGROUND OF THE INVENTION

Some of the technical issues that aircraft designers must address can have significant business and economic impact. For example, aircraft designers must address the risk of foreign object damage (FOD) to aircraft engines and the operational and economic costs associated therewith. Additionally, aircraft designers also must consider the risk of excessive landing gear wheel spray ingestion into engines as well as the risk that runway debris (rocks, water, tire debris, aircraft parts, slush, gear ice, etc.) might also be thrown by the landing gear tires and ingested into the engines.

The adverse impact that engine nacelles and their inlets have on the aircraft's lift (L) and lift-to-drag ratio (L/D) during cruise flight is another important consideration for aircraft designers. Still yet another consideration is the reduction of aircraft engine noise to alleviate its adverse impacts on the passengers as well as the airport's neighboring communities. Indeed, the authority to increase the number of operations at many airports is often withheld because of noise-related environmental impact.

SUMMARY OF THE INVENTION

Accordingly, a need exists in the art for an apparatus and methods that reduce the probability of FOD to aircraft engines and thus mitigate the operational and economic costs associated therewith. Ideally, the apparatus would also be able to reduce the impact of aircraft engine noise on communities adjacent airports as well as mitigate the adverse impact that engine nacelles and their inlets have on aircraft lift (L) and lift-to-drag ratio (L/D) during cruise flight.

In one form, the present invention includes a scarf inlet that is rotatably supported at a forward end portion of an engine nacelle. The rotatable scarf inlet is controllably rotatable with respect to the engine nacelle to a plurality of angular positions or orientations.

In another form, the present invention provides a method of operating a jet aircraft engine on an aircraft. In one embodiment, the method comprises supporting a scarf inlet at a forward end portion of a nacelle of the engine in a manner that enables rotational movement of the scarf inlet relative to the nacelle; and controllably rotating the scarf inlet to a plurality of different angular positions depending on the a phase of operation of the aircraft. The rotatable scarf inlet is preferably rotated to an angular position in which it reduces the possibility of ingestion of foreign object into the engine during takeoff and taxi. While the aircraft is climbing after takeoff, the rotatable scarf inlet is preferably rotated to an angular position in which it at least partially shields engine noise from being transmitted downward and forward. When the aircraft is in a cruise mode of operation, the rotatable scarf inlet is preferably rotated to an angular position in which it improves at least one of compression lift and lift-to-drag ratio.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein:

FIG. 2 is a side view of the rotatable scarf inlet in a preferred cruise configuration;

FIGS. 3A and 3B are detail views of the portion noted 3—3 in FIG. 2 respectively illustrating an actuator system and a locking mechanism that may be used according to a preferred embodiment of the present invention;

Corresponding reference characters indicate corresponding features throughout the drawings.

DETAILED DESCRIPTION OF THE PREFERRED EMBODIMENTS

Figure 1A:
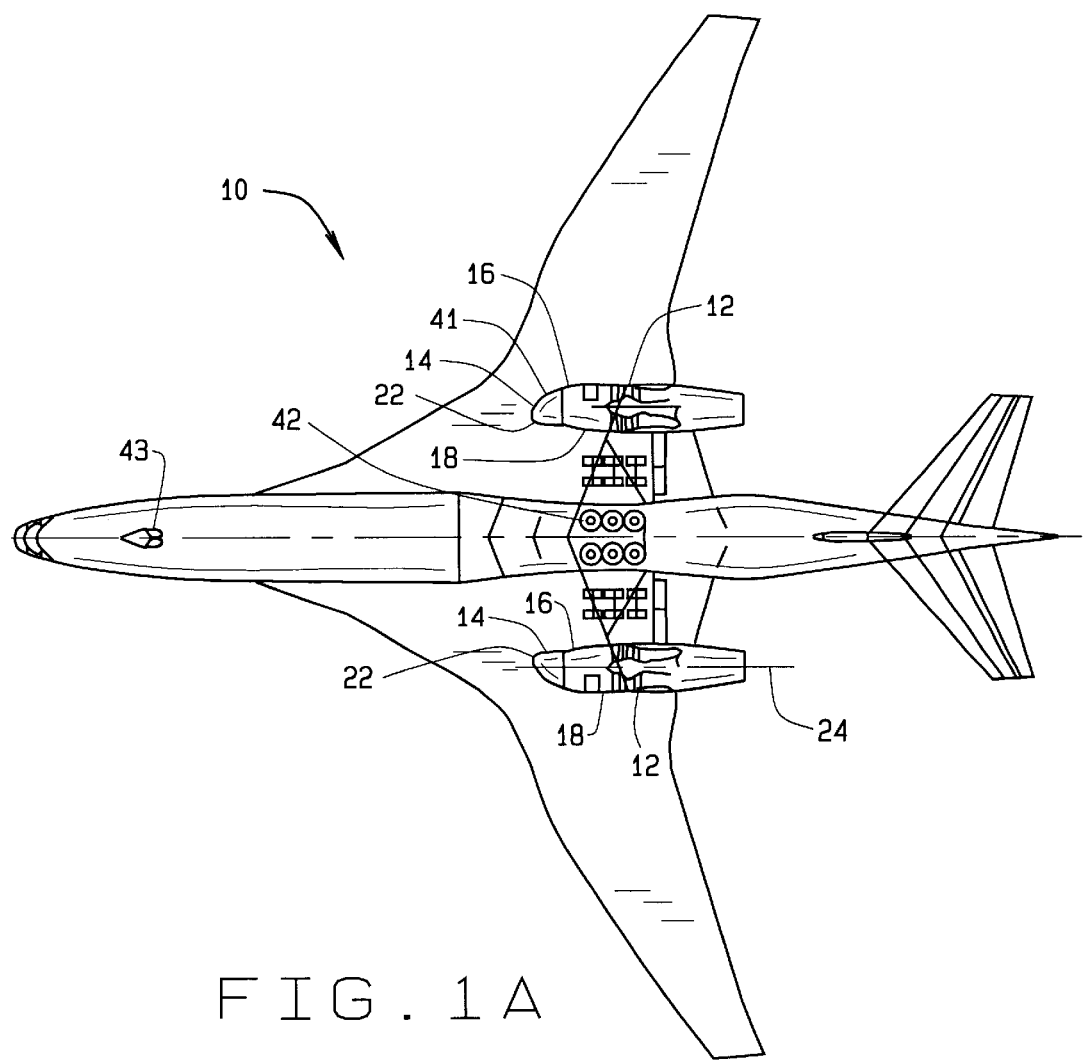
FIGS. 1A and 1B are respective plan and side views of an exemplary aircraft including rotatable scarf inlets in accordance with a preferred embodiment of the present invention, and illustrating the rotatable scarf inlets in a preferred ground roll configuration.

The following description of the preferred embodiment(s) is merely exemplary in nature and is in no way intended to limit the invention, its application, or uses.

Referring to FIG. 1, there is shown an exemplary mobile platform, such as an aircraft 10, that includes two engines 12 and that has been provided with rotatable scarf inlets 14 in accordance with a preferred embodiment of the present invention. As described in greater detail below, the rotatable scarf inlet 14 can be controllably rotated with respect to an engine nacelle 18 to a plurality of different angular positions or orientations. One or more of the angular positions improve at least one performance characteristic of the aircraft 10 during a corresponding operational phase (e.g., cruise, takeoff roll, landing roll, taxi, climb-after-takeoff, etc.).

Figure 1B:
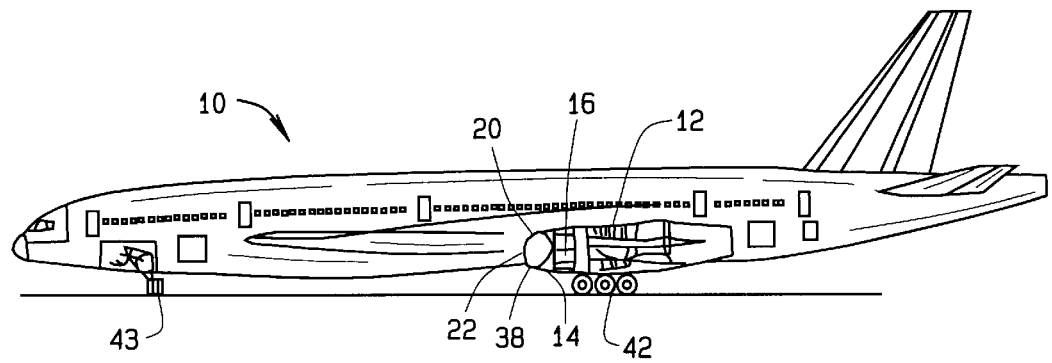

As shown, the rotatable scarf inlet 14 is rotatably supported from a forward end portion 16 of the engine nacelle 18. As shown in FIGS. 1B and 2, the rotatable scarf inlet 14 includes a leading edge 20 disposed forwardly of the nacelle forward end portion 16. The portion of the leading edge 20 that is disposed most forwardly from the nacelle forward end portion 16 is referred to herein as a lip or scarf 22.

The leading edge 20 preferably defines a shape in accordance with a function tailored to the particular aircraft in which the rotatable scarf inlet 14 is being used. By way of example only, the leading edge 20 may define a shape that is substantially elliptical, although other shapes and complex curves are also possible for the leading edge.

The rotatable scarf inlet 14 is engaged to the nacelle forward end portion 16 in a manner that allows the scarf inlet 14 to have a rotational axis that is substantially parallel with the nacelle's 18 longitudinal centedine axis 24. In the illustrated embodiment, the rotational axis of the scarf inlet 14 coincides with the longitudinal centerline axis 24, although such is not required. For example, the rotational axis of the scarf inlet may instead be skewed relative to the longitudinal centerline axis of the nacelle, as described below for an alternative embodiment 114 of the scarf inlet.

Any one of a wide range of suitable mounting systems and methods known in the art may be used to rotationally engage the rotatable scarf inlet 14 to the nacelle forward end portion 16. In addition, the actuation system used to rotatably move the scarf inlet 14 may comprise any one of a wide range of actuation systems (e.g., hydraulic, electric, pneumatic, or other actuation means) known in the art.

In the preferred embodiment shown in FIG. 3A, the rotatable scarf inlet 14 contains an inner bearing race ring 26 disposed at an aft end portion 28 of the scarf inlet 14. The inner bearing race ring 26 includes an integral internal ring gear 27. The nacelle forward end portion includes a fixed or stationary outer bearing race ring 30. A plurality of bearing balls 29 are situated between the outer bearing race ring 30 and the inner bearing race ring 26. The bearing balls 29 provide the scarf inlet 14 with a rotational degree of freedom while also restraining undesired translation, yaw rotation, and pitch rotation of the rotatable scarf inlet 14.

The actuation system includes a motor 32 that drives a motor pinion gear 34 engaged with the internal ring gear 27 of the inner bearing race ring 26. Accordingly, the actuator system operates as follows to rotate the scarf inlet 14 with respect to the engine nacelle 18: the motor 32 rotates the motor pinion gear 34; the rotating motor pinion gear 34 rotates the internal ring gear 27 of the inner bearing race ring 26 and thus causes rotation of the rotatable scarf inlet 14 with respect to the engine nacelle 18.

In addition, any one of a wide range of locking mechanisms known in the art may be used to removably secure the scarf inlet 14 in the various preferred angular orientations. In the preferred embodiment shown in FIG. 3B, the nacelle forward end portion 16 includes at least one locking pin 36. The locking pin 36 is sized to be received within at least one corresponding recess or detent 37 defined by the aft end portion 28 of the rotatable scarf inlet 14. To engage and disengage the locking pin 36 with the recess 37, a locking pin actuator 38 is provided. The locking pin actuator 38 moves the locking pin 36 between a retracted position 39 and an extended position 40. Extension of the locking pin 36 into the recess 37 prevents rotation of the scarf inlet 14. Conversely, retraction of the locking rod 36 from the recess 37 allows the scarf inlet 14 to again be rotated. Preferably, a plurality of locking pins and corresponding recesses are used so that the rotatable scarf inlet 14 can be removably secured in a corresponding number of angular positions or settings.

The actuator system and locking mechanism are preferably operatively associated with an onboard aircraft computer (e.g., flight management computer (FMC)), which allows the rotation of the scarf inlet 14 to be controlled by the flight crew and/or an automatic flight control system on board the aircraft 10.

The operation and at least some of the benefits of the present invention will now be discussed in detail. In FIGS. 1A and 1B, the rotatable scarf inlet 14 is shown in a configuration 41 that is preferred while the aircraft is rolling on the ground, such as during the takeoff roll or taxiing. The rotatable scarf inlet 14 is rotated to dispose the lip 22 at an at least partially inboard and bottom position of the scarf inlet 14. Stated differently, the rotatable scarf inlet 14 is rotated until the lip 22 forms the at least partially inboard and bottom portion of the scarf inlet 14.

At least two benefits are provided by the preferred ground configuration 41 of the rotatable scarf inlet 14. First, the preferred ground roll configuration 41 reduces the risk that foreign object debris (e.g., runway debris, rocks, water, tire debris, aircraft parts, slush, gear ice, etc.) thrown by the main landing gear tires 42 will be ingested by the engine. Another benefit is the reduction of the risk and/or intensity of engine ingestion of the water spray kicked up by nose landing gear tires 43. Accordingly, rotating the scarf inlet 14 to the angular position 41 shown in FIGS. 1A and 1B reduces the risk of engine damage, failure and/or stall during the aircraft's 10 takeoff roll phase.

Figure 4:
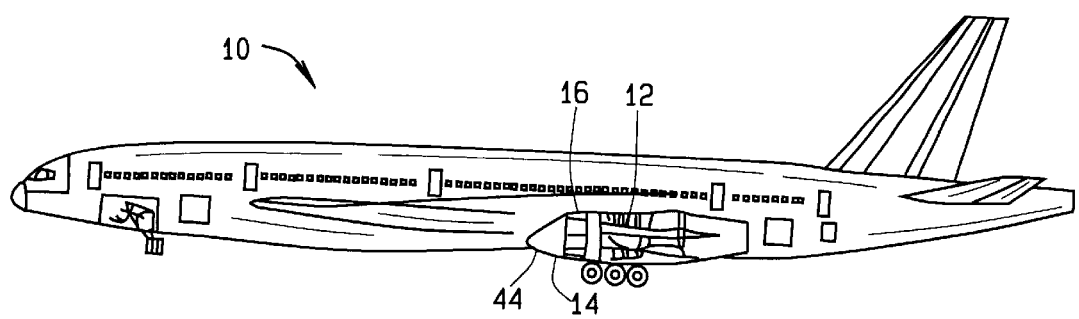
FIG. 4 is a side view of the aircraft shown in FIGS. 1A and 1B but illustrating the rotatable scarf inlet in a preferred climb-after-takeoff configuration.

Referring now to FIG. 4, the rotatable scarf inlet 14 is shown in a configuration 44 that is preferred while the aircraft 10 is climbing after takeoff. The rotatable scarf inlet 14 is rotated until its lip 22 is disposed at a bottommost position of the scarf inlet 14. With the lip 22 forming the bottommost portion of the scarf inlet 14, the rotatable scarf inlet 14 shields aircraft engine noise from being transmitted in a forward and/or downward direction.

At least the following benefits can be realized through the preferred climb-after-takeoff configuration 44 of the rotatable scarf inlet 14. One benefit includes a reduction of engine noise to communities neighboring the airport from which the aircraft 10 departed. Another benefit is the reduction of noise certification risk, community noise fees and/or penalties. Further, the rotatable scarf inlet 14 also reduces the need for other noise-mitigation methods that more adversely impact aircraft performance and/or economics. In addition, the reduction and redirection of aircraft engine noise allows for increased flexibility in managing the environmental impacts of departing and arriving aircraft.

It should be noted that the preferred position of the lip 22 for achieving optimal community noise reduction need not be on the bottommost position of the scarf inlet 14 as shown in FIG. 4. In other embodiments, the lip 22 may be disposed at least partially inboard or outboard from the bottommost position depending at least in part on the particular noise signature attributes of the aircraft and engines for which the rotatable scarf inlet 14 is being used.

Figure 5:
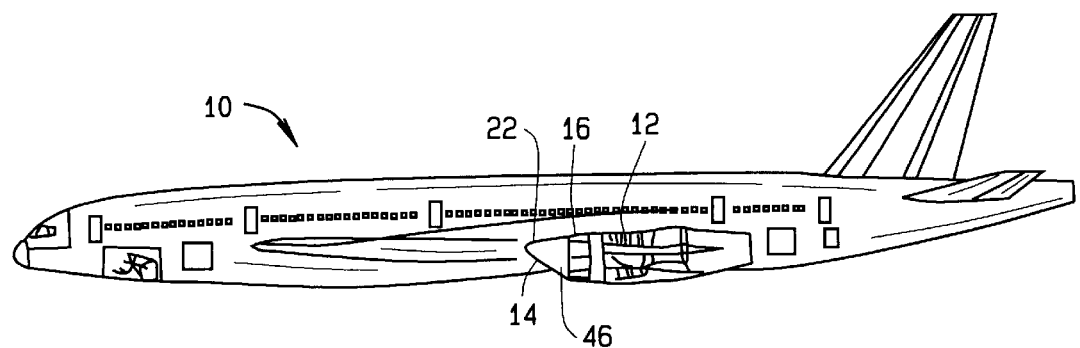
FIG. 5 is a side view of the aircraft shown in FIGS. 1A and 1B but illustrating the rotatable scarf inlet in a preferred cruise configuration.

FIGS. 2 and 5 illustrate the rotatable scarf inlet 14 in an angular position 46 that is preferable when the aircraft 10 is in a cruise mode of operation. The rotatable scarf inlet 14 is rotated until its lip 22 is disposed at a topmost position of the scarf inlet 14.

When the lip 22 is forming the topmost portion of the rotatable scarf inlet 14, the scarf inlet 14 enhances compression lift in transonic flow and improves lift-to-drag ratio (L/D) while the aircraft 10 is cruising. This in turn can provide additional benefits of reduced fuel burn and aircraft related operating costs. Accordingly, the rotatable scarf inlet 14 alleviates at least some of the adverse impact that engine nacelles and their inlets have on aircraft lift and lift-to-drag ratios.

It should be noted that the preferred position of the lip 22 for achieving optimal lift-to-drag ratios and/or compression lift need not be the topmost position of the scarf inlet 14 as shown in FIGS. 2 and 5. In other embodiments, the lip 22 may be disposed at least partially inboard or outboard from the topmost position depending at least in part on the particular aerodynamic attributes of the aircraft on which the rotatable scarf inlet 14 is being used.

It should be further noted that other advantageous angular settings are also possible for the rotatable scarf inlet 14 besides what is shown in FIGS. 1 through 5. For example, the rotatable scarf inlet 14 can be rotated to an angular position that allows the scarf inlet 14 to reduce or mitigate flow separation at various locations around the scarf inlet 14 during various flight conditions (e.g., stall, near-stall, etc.). As another example, the rotatable scarf inlet 14 can be rotated to an angular position that improves flow attributes such as uniformity at an engine fan face. The specific angular position of the scarf inlet 14 needed to achieve either of the aforementioned benefits will depend at least in part on the particular aircraft, engine, and flight conditions in which the rotatable scarf inlet 14 is being used.

Referring now to FIGS. 6 and 7, there is shown an alternative embodiment 114 of the rotatable scarf inlet. The rotatable scarf inlet 114 is rotatably supported at a forward end portion 116 of the nacelle 118. The scarf inlet 114 has an axis of rotation 150 that is skewed relative to the nacelle's 118 longitudinal centerline axis 124, which allows a notation or wobble to be imparted to the scarf inlet 114. This in turn allows the rotatable scarf inlet 114 to be pointed in other directions besides straight forward or upstream.

Figure 6A:
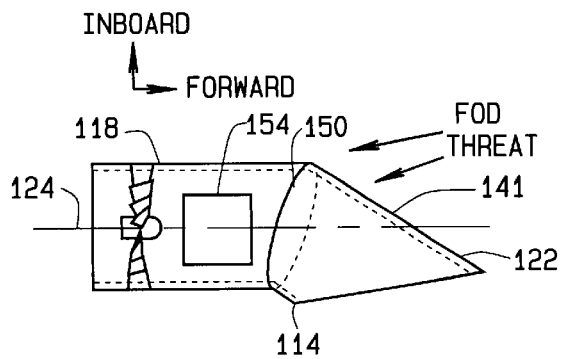
FIGS. 6A and 6B are respective upper and side views of a rotatable scarf inlet according to another preferred embodiment of the present invention, and illustrating the rotatable scarf inlet in a preferred takeoff configuration.
Figure 6B:
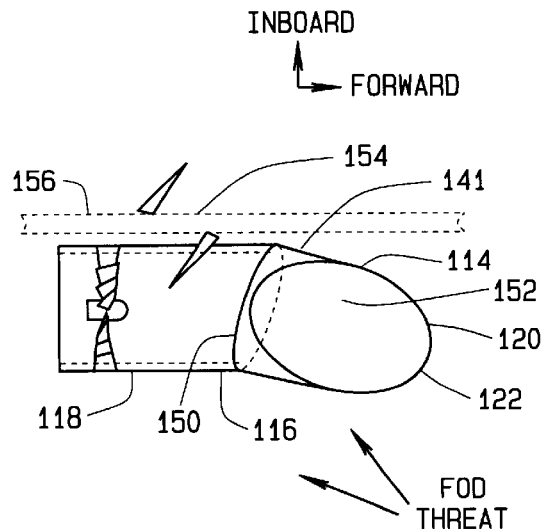

The rotatable scarf inlet 114 includes a circular cross-section through a cutting plane such that the leading edge 120 defines a substantially elliptical shape, as shown in FIG. 6B. It should be noted, however, that the leading edge 120 may define shapes other than elliptical without departing from the spirit and scope of the present invention.

In FIGS. 6A and 6B, the scarf inlet 114 is shown in a configuration 141 preferred while the aircraft is rolling on the ground, such as during takeoff or taxi. As shown, the nutating motion of the scarf inlet 114 allows the inlet opening 152 to be directed away from FOD threats during take-off. During takeoff, an auxiliary air inlet 154 disposed above the wing 156 may be opened to supplement or augment air flow into the engine 112.

Figure 7A:
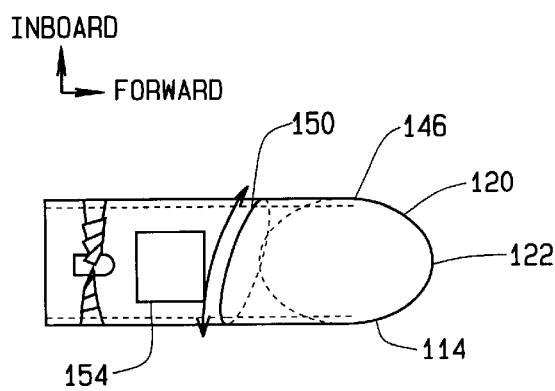
FIGS. 7A and 7B are respective upper and side views of the rotatable scarf inlet shown in FIGS. 6A and 6B but illustrating the rotatable scarf inlet in a preferred cruise configuration.
Figure 7B:
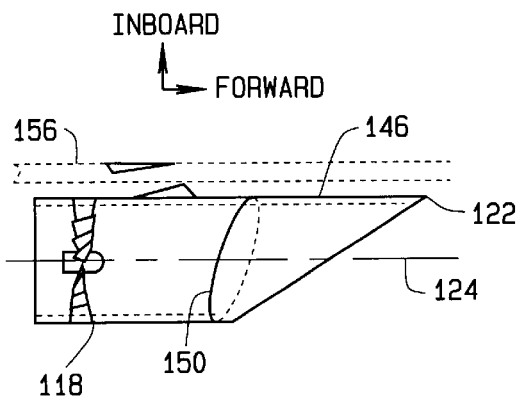

FIGS. 7A and 7B illustrate a preferred cruise configuration 146 (i.e., when the aircraft is in a cruise mode of operation) for the scarf inlet 114 in which the lip 122 is disposed at the topmost position of the scarf inlet 114. During cruise, the auxiliary air intake 154 are preferably closed.

The rotatable scarf inlet 114 can also be used in a manner similar to that shown in FIG. 4. That is, the scarf inlet 114 can be rotated to dispose the lip 122 at the bottommost position of the scarf inlet 114. This in turn allows the rotatable scarf inlet 114 to direct a substantial portion of the noise from the engine 112 outward and upward rather than toward the ground.

It should be noted that further benefits and aircraft operational efficiency can also be realized by fine tuning the angular setting of the scarf inlet 114 for various airflow conditions resulting from variables of attitude, weight, altitude and speed. The scarf inlet 114 can also be employed to allow subtle changes to the engine inlet cross-sectional area as projected from the forward view.

In another form, the present invention provides a method of operating a jet aircraft engine on an aircraft. In one embodiment, the method comprises supporting a scarf inlet 114, 114 at a forward end portion 16, 116 of an engine nacelle 18, 118 in a manner that enables rotational movement of the scarf inlet 14, 114 relative to the nacelle 18, 118; and controllably rotating the rotatable scarf inlet 14, 114 to a plurality of different angular positions depending on the a phase of operation of the aircraft 10. The rotatable scarf inlet 14, 114 is preferably rotated to an angular position 41, 141 in which it reduces the possibility of ingestion of foreign object Into the engine during taxi. The rotatable scarf inlet 14, 114 is preferably rotated to an angular position 44 in which it at least partially shields engine noise from being transmitted downward and forward while the aircraft 10 is climbing after takeoff. While the aircraft 10 is in a cruise mode of operation, the rotatable scarf inlet 14, 114 is preferably rotated to an angular position 46, 146 in which it improves at least one of compression lift and lift-to-drag ratio. position 46, 146 in which it improves at least one of compression lift and lift-to-drag ratio.

It is anticipated that the invention will be applicable to any of a wide range of aircraft (e.g., but not limited to, commercial jets, military jets, private jets, transonic aircraft, supersonic aircraft, subsonic aircraft, among others) regardless of the manner in which the aircraft is piloted (e.g., directly, remotely, via automation, or in a combination thereof, among others). Accordingly, the specific references to aircraft herein should not be construed as limiting the scope of the present invention to only one specific form/type of aircraft.

It is also anticipated that the invention will be applicable to any one of a wide range of nacelles and engines (e.g., but not limited to gas turbine engines, turbofan engines, turbojet engines) regardless of the manner in which the engines and/or the nacelles are mounted to the corresponding aircraft (e.g., but not limited to strut mounted engines, engines mounted toward the forward or aft portion of the wing, under-wing mounted engines, over-wing mounted engines, wing-level engines, aft-body mounted engines, a nose inlet feeding an engine in the aircraft body wherein the rotatable scarf inlet is disposed at the nose of the aircraft, among others). For example, the engine may comprise an engine that utilizes either a turbojet, a turbofan, or a gas turbine driven geared fan to produce thrust. Accordingly, the specific references to engine and nacelle herein should not be construed as limiting the scope of the present invention to only one specific form/type of engine, nacelle, and/or mounting arrangement.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. An engine for a mobile platform, the engine comprising:
    a housing; and
    a scarf inlet rotatably supported at a forward end portion of the housing, the scarf inlet being controllably rotatable relative to the housing about an axis skewed relative to a longitudinal centerline axis of the housing to a plurality of angular positions during different phases of operation of the mobile platform.

2. The engine of claim 1, wherein the housing comprises a nacelle.

3. The engine of claim 2, wherein the scarf inlet is rotatable about an axis skewed relative to a longitudinal centerline axis of the engine nacelle.

4. The engine of claim 3, wherein a nutation is imparted to the scarf inlet during rotation of the scarf inlet.

5. The engine of claim 2, wherein the scarf inlet comprises:
- a leading edge disposed forwardly of the forward end portion of the nacelle; and
- a lip comprising the most forwardly extending portion of the leading edge.

6. The engine of claim 5, wherein the scarf inlet is rotatable to dispose the lip at least one of:
- a topmost position of the scarf inlet; and
- a bottommost position of the scarf inlet; and
- an at least partially inboard and bottom position of the scarf inlet; and
- an at least partially outboard and bottom position of the scarf inlet; and
- an at least partially outboard and top position of the scarf inlet; and
- an at least partially inboard and top position of the scarf inlet.

7. The engine of claim 2, wherein the scarf inlet is rotatable to at least one of:
- a preferred ground roll configuration in which the scarf inlet reduces the possibility of ingestion of foreign object into the engine during taxi;
- a preferred climb-after-takeoff configuration in which the scarf inlet at least partially shield engine noise from being transmitted downward and forward; or
- a preferred cruise configuration in which the scarf inlet improves at least one of compression lift and lift-to-drag ratio.

8. The engine of claim 1, wherein the engine comprises a turbojet to produce thrust.

9. The engine of claim 1, wherein the engine comprises a turbofan to produce thrust.

10. The engine of claim 1, wherein the engine comprises a gas turbine driven geared fan to produce thrust.

11. The engine of claim 1, wherein the mobile platform comprises an aircraft.

12. The engine of claim 11, wherein the aircraft is capable of at least one of near sonic cruise speed and transonic cruise speed.

13. The engine of claim 1, wherein the scarf inlet includes a scarf angle tailored for less than supersonic speeds.

14. The engine of claim 13, wherein the scarf angle is less than forty-five degrees.

15. An aircraft, comprising:
- an engine nacelle including a forward end portion; and
- a scarf inlet rotatably supported from the forward end portion, the scarf inlet being controllably rotatable relative to the engine nacelle about an axis skewed relative to a longitudinal centerline axis of the engine nacelle to a plurality of angular positions during different phases of operation of the aircraft.

16. The aircraft of claim 15, wherein a nutation is imparted to the scarf inlet during rotation of the scarf inlet.

17. The aircraft of claim 15, wherein the scarf inlet comprises:
- a leading edge disposed forwardly of the forward end portion of the nacelle; and
- a lip comprising the most forwardly extending portion of the leading edge.

18. The aircraft of claim 17, wherein the scarf inlet is rotatable to dispose the lip at least one of:
- a topmost position of the scarf inlet; and
- a bottommost position of the scarf inlet; and
- an at least partially inboard and bottom position of the scarf inlet; and
- an at least partially outboard and bottom position of the scarf inlet; and
- an at least partially outboard and top position of the scarf inlet; and
- an at least partially inboard and top position of the scarf inlet.

19. The aircraft of claim 15, further comprising:
- an actuation system for rotating the scarf inlet; and
- a locking mechanism for removably securing the scarf inlet in at least one of the plurality of angular positions.

20. The aircraft of claim 19, wherein the actuation system comprises:
- at least one gear disposed at an aft end portion of the scarf inlet;
- a fixed ring gear disposed at the forward end portion of the engine nacelle, the fixed ring gear being engaged with the at least one gear;
- a motor pinion gear engaged with the at least one gear; and
- a motor for rotating the motor pinion gear.

21. The aircraft of claim 19, wherein the locking mechanism comprises:
- at least one locking pin disposed at the forward end portion of the engine nacelle;
- at least one locking pin recess defined by an aft end portion of the scarf inlet, the locking pin recess being sized to receive the locking pin; and
- a locking pin actuator for moving the locking pin between a retracted position and an extended position.

22. The aircraft of claim 15 wherein the aircraft comprises one of a subsonic aircraft of a transonic aircraft, and wherein the scarf inlet includes a scarf sangle tailored for less than supersonic speeds.

23. The aircraft of claim 22, wherein the scarf angle is less than forty-five degrees.

24. A method of operating a jet engine on an aircraft, the method comprising;
- supporting a scarf inlet from a forward end portion of a nacelle of the engine in a manner that enables rotational movement of the scarf inlet relative to the nacelle about an axis skewed relative to a longitudinal centerline axis of the nacelle; and
- controllably rotating the scarf inlet into a plurality of different angular positions depending on a phase of operation of the aircraft.

25. The method of claim 24, further comprising rotating the scarf inlet to a position during takeoff of the aircraft which reduces the possibility of ingestion of foreign objects into the engine.

26. The method of claim 24, further comprising rotating the scarf inlet to an angular position in which the scarf inlet improves at least one of compression lift and lift-to-drag ratio while the aircraft is in a cruise mode of operation.

27. The method of claim 24, further comprising rotating the scarf inlet to an angular position in which the scarf inlet at least partially shields engine noise from being transmitted downward and forward while the aircraft is climbing after takeoff.

28. The method of claim 24, further comprising rotating the scarf inlet to an angular position in which the rotatable scarf inlet reduces the possibility of ingestion of foreign objects into the engine while the aircraft is taxiing on the ground.

29. The method of claim 24, further comprising rotating the scarf inlet to an angular position in which the scarf inlet mitigates flow separation.

30. The method of claim 24, further comprising rotating the scarf inlet to an angular position in which the scarf inlet improves air flow attributes into the engine.

31. An engine for a mobile platform, the engine comprising:

a housing; and inlet structure rotatably supported at a forward end portion of the housing, the inlet structure defining a scarf inlet and a leading edge having a smoothly shaped contour, the inlet structure being controllably rotatable relative to the housing about an axis skewed relative to a longitudinal centerline axis of the housing to a plurality of angular positions during different phases of operation of the mobile platform.

32. The engine of claim 31, wherein the leading edge has a generally elliptically shaped contour.

33. The engine of claim 31, wherein the engine housing comprises a nacelle.

34. The engine of claim 31, wherein a nutation is imparted to the inlet structure during rotation of the inlet structure.

35. The engine of claim 31, wherein the mobile platform comprises an aircraft, and wherein the inlet structure is rotatable to each of:

a configuration in which the inlet structure reduces the possibility of ingestion of foreign objects and liquid spray into the engine while the aircraft is on the ground;

a configuration in which the inlet structure at least partially shields engine noise from being transmitted generally downward and forward; and a configuration in which the inlet structure improves at least one of compression lift and lift-to-drag ratio for the aircraft while the aircraft is in a cruise mode of operation.

36. The engine of claim 31, further comprising:

an actuation system for rotating the inlet structure; and a locking mechanism for removably securing the inlet structure in at least one of the plurality of angular positions.

37. The engine of claim 36, wherein the actuation system comprises;

at least one gear disposed at an aft end portion of the inlet structure;

a fixed ring gear disposed at the forward end portion of the engine housing, the fixed ring gear being engaged with the at least one gear;

a motor pinion gear engaged with the at least one gear; and a motor for rotating the motor pinion gear.

38. The engine of claim 36, wherein the locking mechanism comprises:

at least one locking pin disposed at the forward end portion of the engine housing;

at least one locking pin recess defined by an aft end portion of the inlet structure, the locking pin recess being sized to receive the locking pin; and a locking pin actuator for moving the locking pin between a retracted position and an extended position.

39. The engine of claim 31, wherein the inlet structure is rotatable to dispose a most forwardly extending portion of the leading edge at at least one of:

a topmost position of the leading edge; and a bottommost position of the leading edge; and an at least partially inboard and bottom position of the leading edge; and an at least partially outboard and bottom position of the leading edge; and an at least partially outboard and top position of the leading edge; and an at least partially inboard and top position of the leading edge.

40. An aircraft comprising the engine of claim 31.

41. The engine of claim 31, wherein the inlet structure forms an aerodynamically smooth outer surface of the housing.

42. The engine of claim 31, wherein the mobile platform comprises an aircraft, and wherein the inlet structure is adapted to improve inlet air flow characteristics during different operating conditions of the aircraft including different angles of attack and sideslip.

43. The engine of claim 31, wherein the inlet structure includes a generally cylindrical surface, and wherein the scarf inlet has a smoothly shaped contour along the generally cylindrical surface.

44. The engine of claim 31, wherein the scarf angle is less than forty-five degrees.

45. An engine for an aircraft, the engine comprising a housing and means for defining an inlet at a forward end portion of the housing, for reducing the possibility of ingestion of foreign objects and liquid spray into the engine while the aircraft is on the ground, for at least partially shielding engine noise from being transmitted generally downward and forward while the aircraft is climbing after takeoff, and for improving at least one of compression lift and lift-to-drag ratio for the aircraft while the aircraft is In a cruise mode of operation, and means for rotatably supporting the inlet defining means at the forward end portion of the housing such that the inlet defining means is rotatable about an axis skewed relative to a longitudinal centerline axis of the housing.

46. The engine of claim 45, further comprising means for controllably rotating the inlet defining means relative to the housing to a plurality of angular positions during different phases of operation of the mobile platform.

* * * * *